US012367798B2

(12) United States Patent
Tsubakino

(10) Patent No.: US 12,367,798 B2
(45) Date of Patent: Jul. 22, 2025

(54) SLEW RATE ENHANCEMENT AT SOURCE AMPLIFIER INPUTS

(71) Applicant: Synaptics Incorporated, San Jose, CA (US)

(72) Inventor: Keita Tsubakino, Tokyo (JP)

(73) Assignee: Synaptics Incorporated, San Jose, CA (US)

( * ) Notice: Subject to any disclaimer, the term of this patent is extended or adjusted under 35 U.S.C. 154(b) by 99 days.

(21) Appl. No.: 18/472,068

(22) Filed: Sep. 21, 2023

(65) Prior Publication Data

US 2025/0104587 A1 Mar. 27, 2025

(51) Int. Cl.
*G09G 3/20* (2006.01)

(52) U.S. Cl.
CPC ....... *G09G 3/20* (2013.01); *G09G 2310/0275* (2013.01); *G09G 2310/0291* (2013.01); *G09G 2320/0252* (2013.01); *G09G 2330/028* (2013.01)

(58) Field of Classification Search
None
See application file for complete search history.

(56) References Cited

U.S. PATENT DOCUMENTS

2006/0227638 A1* 10/2006 Kudo .................. G09G 3/3688 365/203
2012/0206506 A1* 8/2012 Kim ......................... G09G 3/20 345/690
2021/0012743 A1* 1/2021 Lee ...................... G09G 3/3685
2021/0043123 A1* 2/2021 Lee .......................... G09G 3/20

* cited by examiner

*Primary Examiner* — Nicholas J Lee
(74) *Attorney, Agent, or Firm* — Leydig, Voit & Mayer, Ltd.

(57) ABSTRACT

A display driver includes a plurality of gamma bus lines and a drive leg configured to receive pixel data. The drive leg includes a decoder having first and second outputs, a source amplifier having a set of inputs, and a source interpolation selector. The decoder electrically connects, based on the pixel data, the first output to a first one of the gamma bus lines and the second output to a second one of the gamma bus lines. The source amplifier provides a data voltage to a display panel based on a set of input voltages at the set of inputs. The source interpolation selector provides, based on the pixel data, electrical connections between the first and second outputs of the decoder and the set of inputs of the source amplifier, and electrically connects the first and second outputs of the decoder during a first period of a horizontal sync period.

20 Claims, 11 Drawing Sheets

SLEW RATE ENHANCEMENT AT SOURCE AMPLIFIER INPUTS

TECHNICAL FIELD

This disclosure relates generally to devices and methods for driving display panels, more particularly, to slew rate enhancement at source amplifier inputs.

BACKGROUND

A display driver of a panel display device, such as a liquid crystal display (LCD) device, an organic light emitting diode (OLED) display device, and a micro light emitting diode (μLED) display device, may use source amplifiers to drive source lines of the display panel. In a typical implementation, the source amplifiers may each be configured to receive one or more gamma voltages selected by a decoder based on pixel data and generate a data voltage corresponding to the pixel data from the received one or more gamma voltages. The data voltages generated by the source amplifiers may be output to source lines of the display panel and then provided to selected pixels of the display panel to update or program the pixels.

Due to recent increases in the display resolution and the frame rate of panel display devices, settling time reduction can be an issue with source amplifiers. The settling time referred to herein is the time required for an output to reach and remain within a given error band following some input stimulus. Reducing the settling time of source amplifiers may enhance the speed of operation of the display driver, and therefore source amplifiers may be designed to reduce the settling time.

SUMMARY

This summary is provided to introduce a selection of concepts in a simplified form that are further described below. This summary is not intended to necessarily identify key features or essential features of the present disclosure. The present disclosure may include the following various aspects and embodiments.

In an exemplary embodiment, the present disclosure provides a display driver that includes a plurality of gamma bus lines on which a plurality of gamma voltages are generated and a drive leg configured to receive first pixel data and the plurality of gamma voltages. The drive leg includes a decoder, a source amplifier, and a source interpolation selector. The decoder has first and second outputs and is configured to electrically connect the first output to a first gamma bus line of the plurality of gamma bus lines based on the first pixel data, and electrically connect the second output to a second gamma bus line of the plurality of gamma bus lines based on the first pixel data. The source amplifier has a set of inputs and is configured to provide a data voltage to a display panel based on a set of input voltages at the set of inputs. The source interpolation selector is configured to provide, based on the first pixel data, electrical connections between the first and second outputs of the decoder and the set of inputs of the source amplifier. The source interpolation selector is further configured to electrically connect the first and second outputs of the decoder during a first period of a horizontal sync period.

In another exemplary embodiment, the present disclosure provides a display device that includes a display panel and a display driver. The display driver includes a plurality of gamma bus lines on which a plurality of gamma voltages are generated, respectively, and a drive leg configured to receive first pixel data and the plurality of gamma voltages. The drive leg includes a decoder, a source amplifier, and a source interpolation selector. The decoder has first and second outputs and is configured to electrically connect the first output to a first gamma bus line of the plurality of gamma bus lines based on the first pixel data, and electrically connect the second output to a second gamma bus line of the plurality of gamma bus lines based on the first pixel data. The source amplifier has a set of inputs and is configured to provide a data voltage to the display panel based on a set of input voltages at the set of inputs. The source interpolation selector is configured to provide, based on the first pixel data, electrical connections between the first and second outputs of the decoder and the set of inputs of the source amplifier. The source interpolation selector is further configured to electrically connect the first output and second output of the decoder during a first period of a horizontal sync period.

In yet another exemplary embodiment, the present disclosure provides a method. The method includes generating a plurality of gamma voltages on a plurality of gamma bus lines, respectively. The method further includes electrically connecting a first output of a decoder to a first gamma bus line of the plurality of gamma bus lines based on first pixel data provided to the decoder, and electrically connecting a second output of the decoder to a second gamma bus line of the plurality of gamma bus lines based on the first pixel data. The method further includes electrically connecting the first output and second output of the decoder during a first period of a horizontal sync period. The method further includes electrically connecting, based on the first pixel data, the first and second outputs of the decoder to a set of inputs of a source amplifier during a second period of the horizontal sync period, the second period following the first period. The method further includes providing, by the source amplifier, a data voltage to a display panel based on a set of input voltages at the set of inputs during the first period and the second period.

Further features and aspects are described in additional detail below with reference to the attached drawings.

Figure 1:
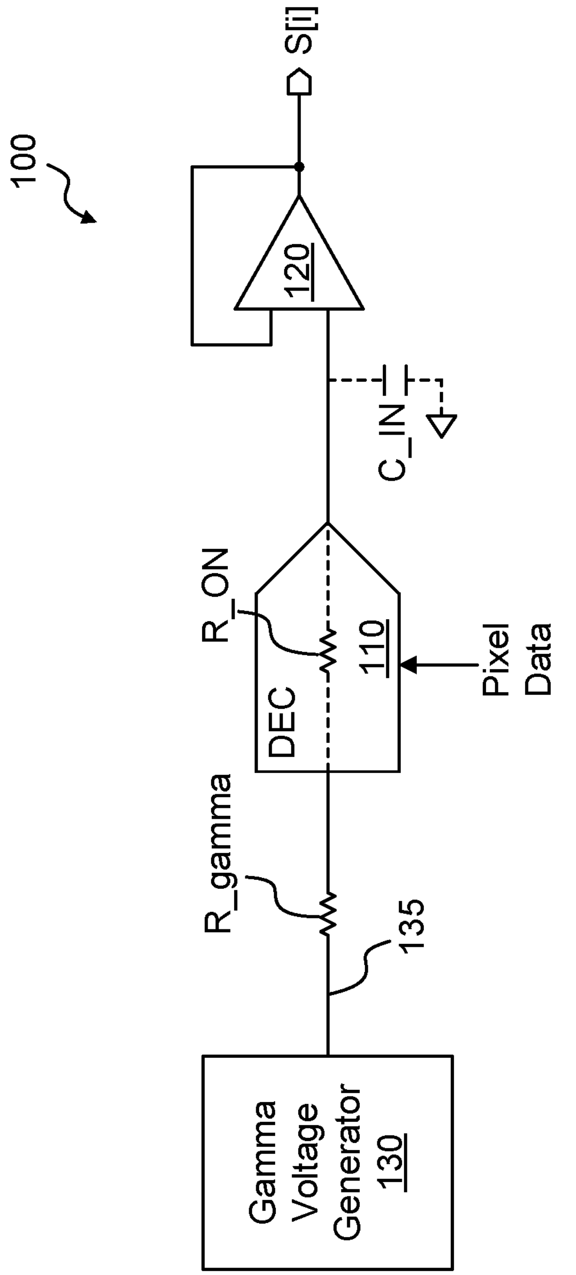
FIG. 1 shows an example partial configuration of a display driver that includes a source amplifier.

To facilitate understanding, identical reference numerals have been used, where possible, to designate identical elements that are common to the figures. It is contemplated that elements disclosed in one embodiment may be beneficially utilized in other embodiments without specific recitation. Suffixes may be attached to reference numerals for distinguishing identical elements from each other. The drawings referred to herein should not be understood as being drawn to scale unless specifically noted. Also, the drawings are often simplified and details or components omitted for clarity of presentation and explanation. The drawings and discussion serve to explain principles discussed below, where like designations denote like elements.

DETAILED DESCRIPTION

The following detailed description is exemplary in nature and is not intended to limit the disclosure or the application and uses of the disclosure. Furthermore, there is no intention to be bound by any expressed or implied theory presented in the preceding background, summary and brief description of the drawings, or the following detailed description.

In the following detailed description, numerous specific details are set forth in order to provide a more thorough understanding of the disclosed technology. However, it will be apparent to one of ordinary skill in the art that the disclosed technology may be practiced without these specific details. In other instances, well-known features have not been described in detail to avoid unnecessarily complicating the description.

The term "coupled" as used herein means connected directly to or connected through one or more intervening components or circuits. Further, throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

As discussed above, due to recent increases in the display resolution and the frame rate of panel display devices, settling time reduction can be an issue with source amplifiers. Reducing the settling time of source amplifiers may enhance the speed of operation of the display driver, and therefore source amplifiers may be designed to reduce the settling time.

The present disclosure recognizes that one approach to reduce the settling time of a source amplifier is to enhance or increase the slew rate at one or more inputs of the source amplifier. The slew rate referred to herein is the rate of voltage change per unit time. With a high slew rate at an input of the source amplifier, the voltage at the input of the source amplifier will promptly reach the desired voltage level when driven to the desired voltage level, resulting in a reduced settling time of the source amplifier. In the following, a description is first given of the slew rate at the input of a source amplifier.

FIG. 1 shows an example partial configuration of a display driver 100 that includes a source amplifier 120. In the configuration shown in FIG. 1, a decoder 110 is configured to select a gamma voltage from gamma voltages generated by the gamma voltage generator 130 based on pixel data and provide the selected gamma voltage to the source amplifier 120. The source amplifier 120 is configured to generate a data voltage from the selected gamma voltage and output the data voltage to a source output S[i] coupled to a pixel to be programmed.

The slew rate at the input of the source amplifier 120 depends an RC time constant for the input of the source amplifier 120. In the configuration shown in FIG. 1, the RC time constant is the product of the input capacitance C_IN of the source amplifier 120 and the resistance across the path that provides the selected gamma voltage from the gamma voltage generator 130 to the input of the source amplifier 120. The path includes a gamma bus line 135 that provides the selected gamma voltage from the gamma voltage generator 130 to the decoder 110 and serially-coupled switches in the decoder 110. The resistance across the path is the sum of the resistance R_gamma across the gamma bus line 135 and the on-resistance R_ON of the decoder 110, where the on-resistance R_ON may be the sum of the on-resistances of the serially-coupled switches of the decoder 110. The slew rate at the input of the source amplifier 120 can be enhanced by reducing the effective resistance across the path that provides the selected gamma voltage to the input of source amplifier 120.

Based on this knowledge, the present disclosure provides various techniques for reducing the effective resistances across the paths that provide selected gamma voltages from the gamma voltage generator to the inputs of the source amplifiers in the display driver. Various embodiments for enhancing or increasing the slew rate at the inputs of the source amplifiers are described below.

Figure 2:
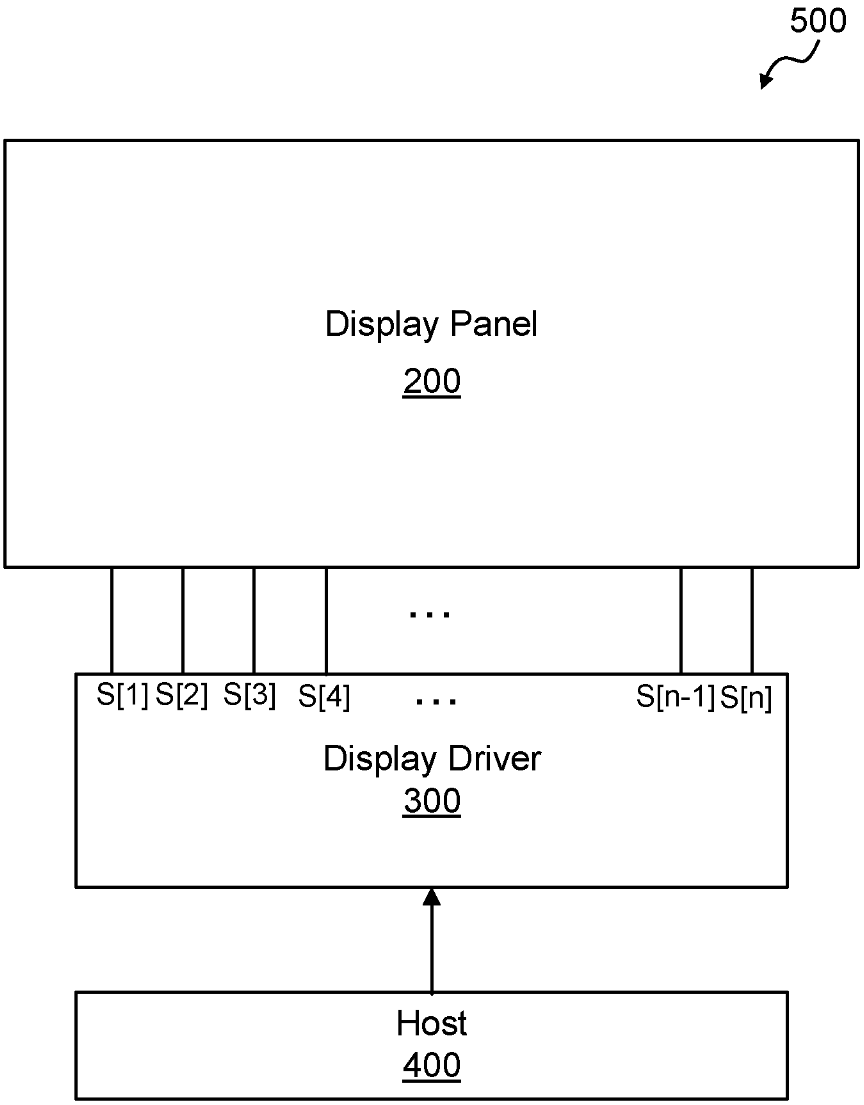
FIG. 2 shows an example configuration of a panel display device, according to one or more embodiments.

FIG. 2 shows an example configuration of a display device 500, according to one or more embodiments. In the shown embodiment, the display device 500 is configured as a panel display device that includes a display panel 200 and display driver 300. The display driver 300 is configured to drive the display panel 200 under the control of a host 400. Examples of the host 400 include an application processor, a central processing unit (CPU), and other processors and controllers suitable for controlling the display device 500. In one implementation, the display driver 300 is configured to generate data voltages based on pixel data received from the host 400 and output the data voltages to the display panel 200 from the source outputs S[1] to S[n]. The data voltages are provided to pixels of the display panel 200 to program the pixels.

Figure 3A:
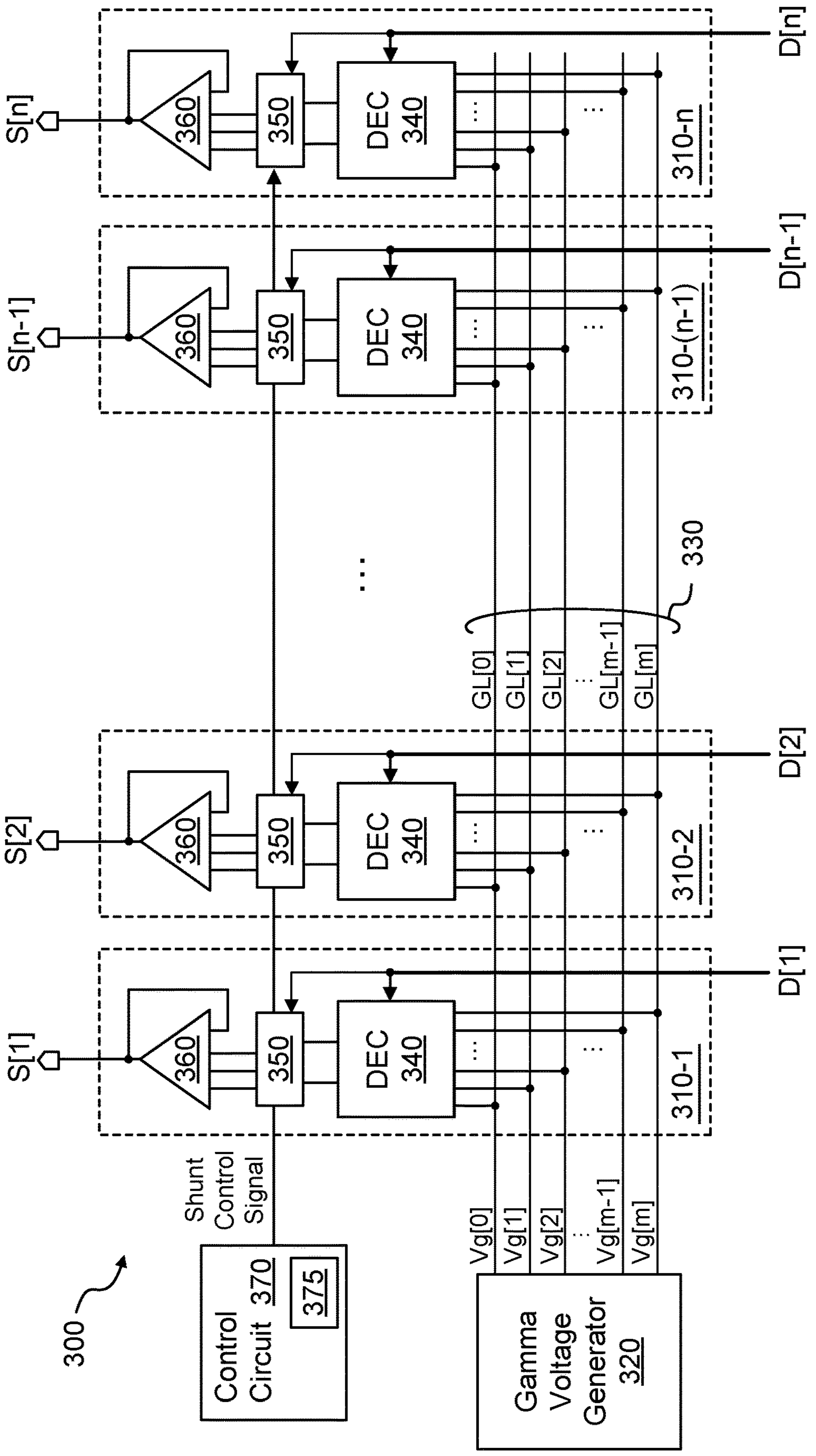
FIG. 3A shows an example partial configuration of a display driver, according to one or more embodiments.

FIG. 3A shows an example partial configuration of the display driver 300, according to one or more embodiments. In the shown embodiment, the display driver 300 includes a set of drive legs 310-1 to 310-*n*, where n is a natural number of two or more, a gamma voltage generator 320, and a control circuit 370. The drive legs 310-1 to 310-*n* may be collectively referred to simply as drive legs 310 when not distinguished from each other.

The drive legs 310-1 to 310-*n* are configured to generate and output data voltages to the source outputs S[1] to S[n] based on pixel data D[1] to D[n], respectively. The pixel data D[1] to D[n] specify greylevels of pixels to be programmed with the data voltages output from the source outputs S[1] to S[n], respectively. The data voltages output from the source outputs S[1] to S[n] have voltage levels corresponding to the greylevels of the pixel data D[1] to D[n], respectively. In some implementations, the pixel data D[1] to D[n] may be generated by applying desired image processing (e.g., color adjustment, scaling, demura, overshoot driving, contrast enhancement, gamma transformation, and other image processing) to the pixel data received from the host 400 (shown in FIG. 2). In other implementations, the pixel data received from the host 400 may be used as the pixel data D[1] to D[n] without modification. The drive legs 310-1 to **310-*n* are configured to generate the data voltages using a set of gamma voltages Vg[0] to Vg[m] received from the gamma voltage generator 320, where m is a natural number of two or more. The gamma voltage generator 320 is configured to generate and provide the gamma voltages Vg[0] to Vg[m] to each of the drive legs 310-1 to 310-*n* via a gamma bus 330 that includes a set of gamma bus lines GL[0] to GL[m]. The gamma voltages Vg[0] to Vg[m] are generated on the gamma bus lines GL[0**] to GL[m], respectively.

Figure 3B:
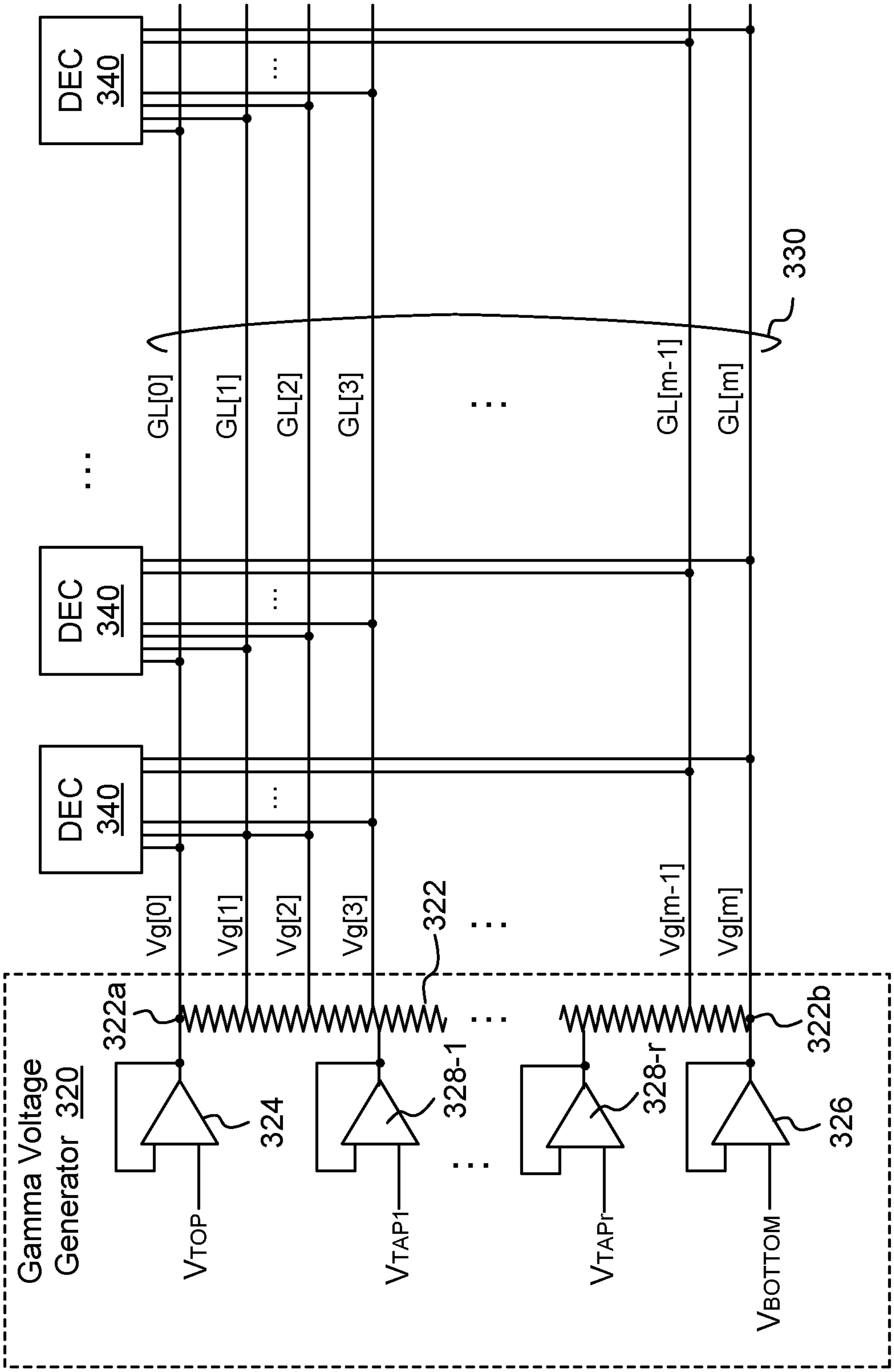
FIG. 3B shows an example configuration of a gamma voltage generator, according to one or more embodiments.

FIG. 3B shows an example configuration of the gamma voltage generator 320, according to one or more embodiments. In the shown embodiment, the gamma voltage generator 320 includes a gamma resistor string 322, a gamma top amplifier 324, a gamma bottom amplifier 326, and a set of gamma tap amplifiers 328-1 to **328-*r* (two shown), where r is a natural number of one or more. The gamma top amplifier 324 is configured to provide a gamma top voltage $V_{TOP}$ to a first end 322*a* of the gamma resistor string 322, and the gamma bottom amplifier 326 is configured to provide a gamma bottom voltage $V_{BOTTOM}$ to a second end 322*b* of the gamma resistor string 322. The gamma tap amplifiers 328-1 to 328-*r* are configured to provide tap voltages $V_{TAP1}$ to $V_{TAPr}$, respectively, to corresponding intermediate taps of the gamma resistor string 322. The gamma bus line GL[0] is coupled to the first end 322*a* of the gamma resistor string 322, and therefore the gamma voltage Vg[0] is equal to the gamma top voltage $V_{TOP}$. The gamma bus line GL[m] is coupled to the second end 322*b* of the gamma resistor string 322, and therefore the gamma voltage Vg[m] is equal to the gamma bottom voltage $V_{BOTTOM}$. The gamma bus lines GL[1] to GL[m−1] are coupled to intermediate positions of the gamma resistor string 322 to generate the gamma voltages Vg[1] to Vg[m−1] on the gamma bus lines GL[1] to GL[m−1] through voltage division using the gamma resistor string 322**.

Referring back to FIG. 3A, the drive legs 310 each include a decoder (DEC) 340, a source interpolation selector 350, and a source amplifier 360. The decoder 340 of each drive leg 310 has a set of inputs coupled to the gamma bus lines GL[0] to GL[m], respectively, and two outputs coupled to the source interpolation selector 350. The source amplifier 360 has a set of inputs coupled to the source interpolation selector 350. In the shown embodiment, the source amplifier 360 has three inputs. In other embodiments, the number of the inputs of the source amplifier 360 may be two, four, or more. The source interpolation selector 350 is configured to provide electrical connections between the outputs of the decoder 340 and the inputs of the source amplifier 360.

The display driver 300 further includes a control circuit 370 configured to generate and provide a shunt control signal to the source interpolation selectors 350 of the respective drive legs 310. As discussed in detail later, the shunt control signal is used to instruct each source interpolation selector 350 to electrically connect the two outputs of the corresponding decoder 340 to thereby shunt (or short-circuit) the two outputs. The control circuit 370 may include a register 375 that stores a register value used to control the shunt control signal. The register value stored in the register 375 may indicate a duration of a time period during which the shunt control signal is held asserted each time the shunt control signal is asserted. In one implementation, the register 375 is configured to be accessible by an entity external to the display driver 300, such as the host 400 shown in FIG. 1. In such an implementation, the external entity, such as the host 400, may be configured to program the register value stored in the register 375.

Figure 4:
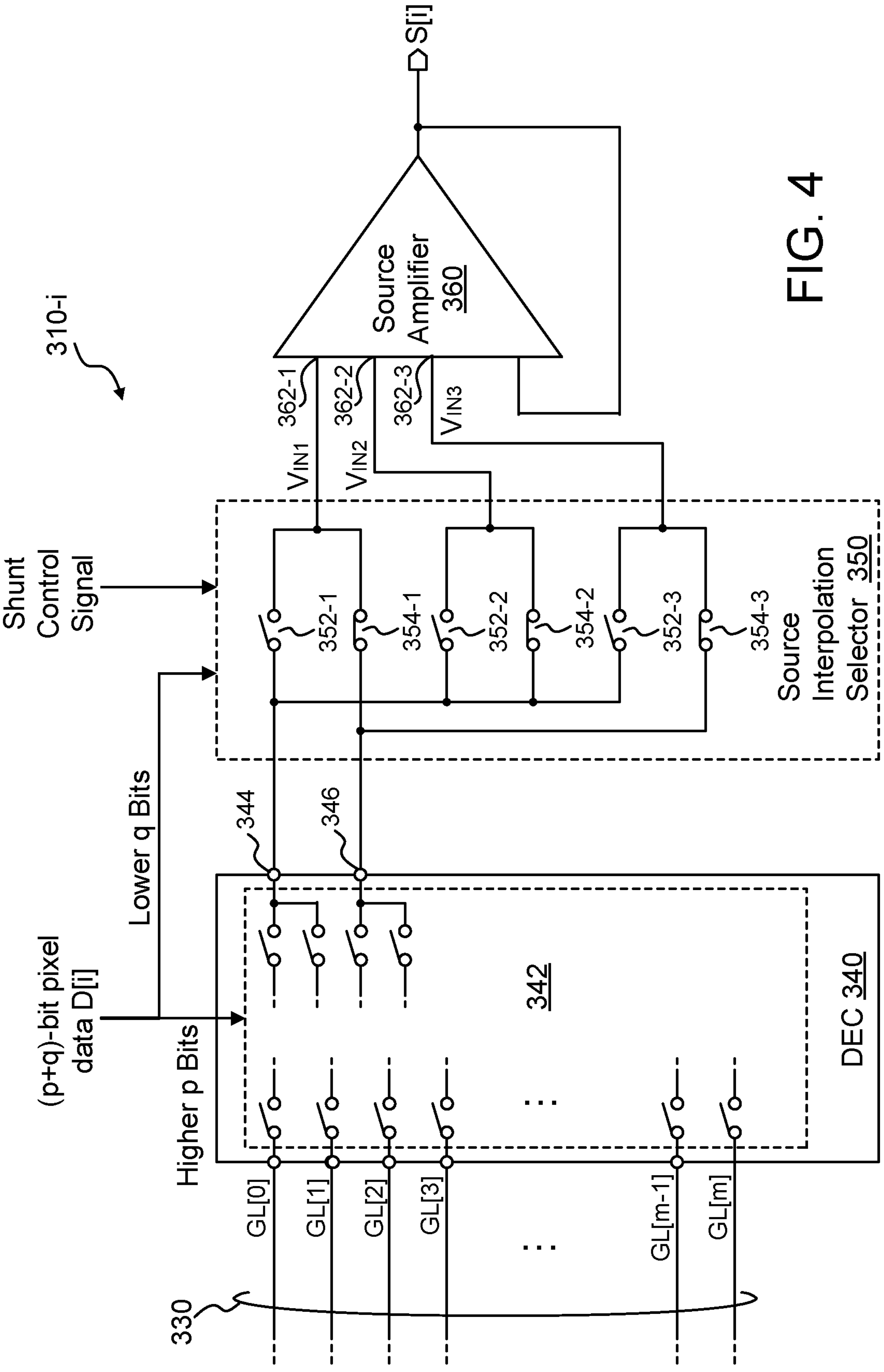
FIG. 4 shows an example configuration of a drive leg, according to one or more embodiments.

FIG. 4 shows an example configuration of each drive leg **310-*i*, according to one or more embodiments. In the shown embodiment, the decoder 340 of the drive legs 310-*i* includes a switch array 342, a first output 344, and a second output 346. The switch array 342 is configured to select two of the gamma bus lines GL[0] to GL[m] based on most significant p-bits (or higher p-bits) of the pixel data D[i] and couple the selected two gamma bus lines to the first and second outputs 344 and 346**, respectively, where the pixel data D[i] is (p+q)-bit data. In embodiments where the pixel data D[i] is 10-bit data, for example, p may be eight and q may be two.

The source amplifier 360 has a set of inputs and configured to drive the source output S[i] based on the input voltages at the inputs. In one implementation, the source amplifier 360 may be configured to drive the source output S[i] to a voltage that is a weighted average of the voltages at the inputs of the source amplifier 360. In the shown embodiment, the source amplifier 360 has three inputs 362-1, 362-2, and 362-3. In one implementation, the weights assigned to the inputs 362-1, 362-2, and 362-3 may be 1/4, 2/4, and 1/4, respectively. In this case, the voltage $V_{OUT}$ at the source output S[i] is expressed by the following expression (1):

$$V_{OUT} = (1/4)V_{IN1} + (2/4)V_{IN2} + (1/4)V_{IN3}, \tag{1}$$

where $V_{IN1}$, $V_{IN2}$, and $V_{IN3}$ are the voltages at the inputs 362-1, 362-2, and 362-3, respectively. The voltage generated at the source output S[i] is used as a data voltage to program a selected pixel coupled to the source output S[i].

The source interpolation selector 350 is configured to operate in response to least significant q-bits (or lower q-bits) of the (p+q)-bit pixel data D[i] and the shunt control signal received from the control circuit 370 (shown in FIG. 3A). The source interpolation selector 350 is configured to provide electrical connections between the outputs of the decoder 340 and the inputs of the source amplifier 360 based on the least significant q-bits of the (p+q)-bit pixel data D[i]. As discussed in detail later, the electrical connections within the source interpolation selector 350 are controlled based on the least significant q-bits of the (p+q)-bit pixel data D[i] to allow the source amplifier 360 to provide the data voltage corresponding to the pixel data D[i] to the source output S[i]. Further, the source interpolation selector 350 is configured to electrically connect the first and second outputs 344 and 346 of the decoder 340 in response to the shunt control signal to shunt or short-circuit the first and second outputs 344 and 346.

In the shown embodiment, the source interpolation selector 350 includes a first set of switches 352-1, 352-2, and 352-3 and a second set of switches 354-1, 354-2, and 354-3. The switches 352-1, 352-2, and 352-3 of the first set are coupled between the first output 344 of the decoder 340 and the inputs 362-1, 362-2, and 362-3, respectively. The switches 354-1, 354-2, and 354-3 of the second set are coupled between the second output 346 of the decoder 340 and the inputs 362-1, 362-2, and 362-3, respectively.

In one implementation, the source interpolation selector 350 has two modes: a select mode and a shunt mode. In the select mode, in which the shunt control signal is deasserted, the source interpolation selector 350 is configured to electrically connect one of the first and second outputs 344 and 346 of the decoder 340 to the respective inputs 362-1, 362-2, and 362-3 based on the least significant q bits of the pixel data D[i]. More specifically, the source interpolation selector 350 is configured to close (or turn on) one of the switches 352-1 and 354-1 based on the least significant q bits of the pixel data D[i] to electrically connect the corresponding one of the first and second outputs 344 and 346 to the input 362-1 of the source amplifier 360. The source interpolation selector 350 is further configured to close one of the switches 352-2 and 354-2 based on the least significant q bits of the pixel data D[i] to electrically connect the corresponding one of the first and second outputs 344 and 346 to the input 362-2 of the source amplifier 360. The source interpolation selector 350 is further configured to close one of the switches 352-3 and 354-3 based on the least significant q bits of the pixel data D[i] to electrically connect the corresponding one of the first and second outputs 344 and 346 to the input 362-3 of the source amplifier 360. It is noted that, in the select mode, the source interpolation selector 350 electrically disconnects the first and second outputs 344 and 346 of the decoder 340 from each other.

In the shunt mode, in which the shunt control signal is asserted, the source interpolation selector 350 closes (or turns on) all the switches 352-1, 352-2, 352-3, 354-1, 354-2, and 354-3 to shunt or short-circuit the first and second outputs 344 and 346 of the decoder 340 and further electrically connects both the first and second outputs 344 and 346 to each of the inputs 362-1, 362-2, and 362-3 of the source amplifier 360. As will be discussed in detail later, shunting (or short-circuiting) the first and second outputs 344 and 346 by the source interpolation selector 350 effectively reduces the effective resistances of the paths that provide the selected gamma voltages from the gamma voltage generator 320 to the inputs 362-1, 362-2, and 362-3 of the source amplifier 360, thereby enhancing the slew rate at the inputs 362-1, 362-2, and 362-3.

Figure 5:
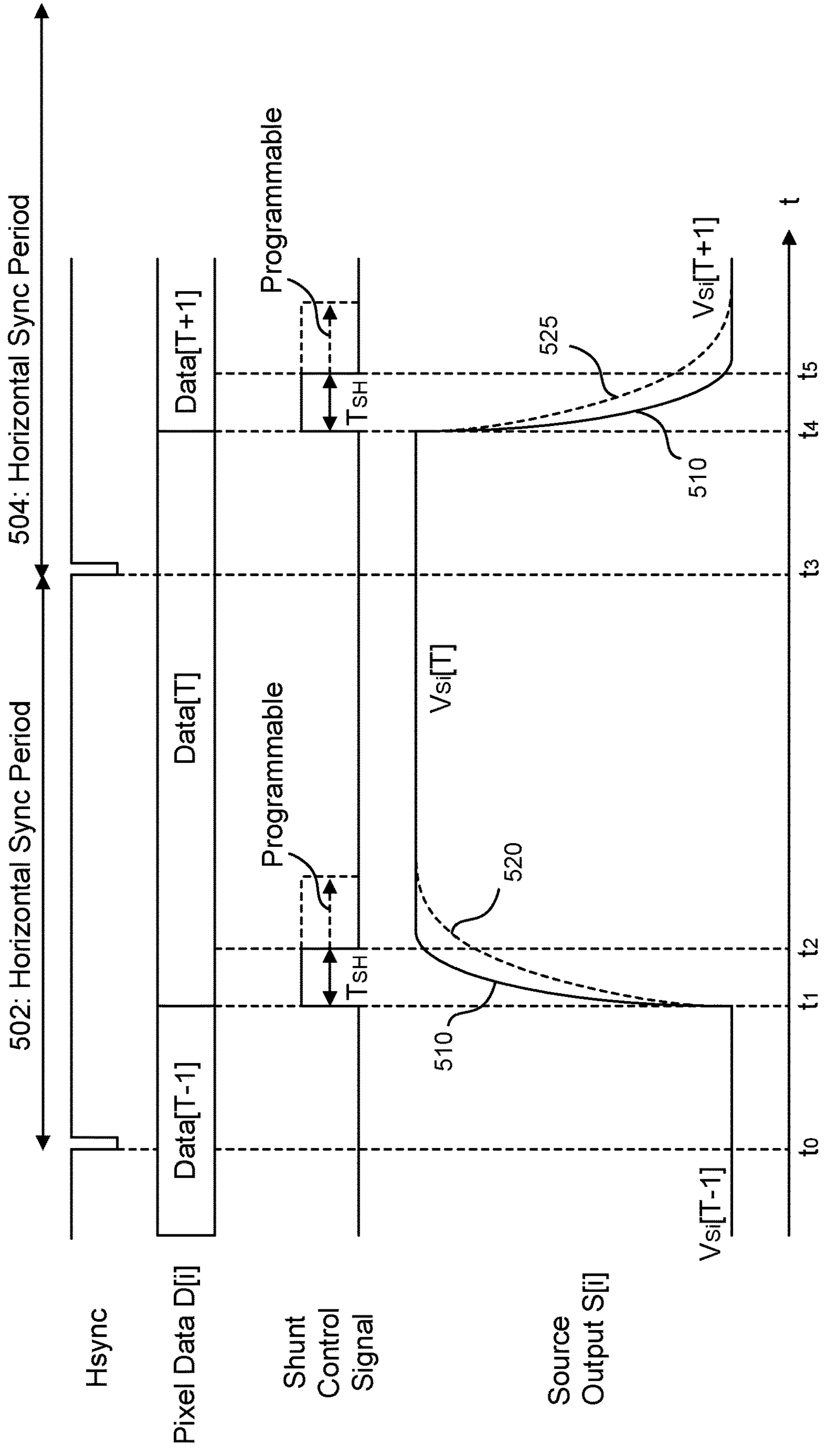
FIG. 5 shows an example operation of a drive leg, according to one or more embodiments.

FIG. 5 shows an example operation of the drive leg 310-*i* shown in FIG. 4 during horizontal sync periods 502 and 504, according to one or more embodiments. At time $t_0$, the horizontal sync signal used in the display driver 300 is asserted to initiate the horizontal sync period 502. At the beginning of the horizontal sync period 502, the pixel data D[i] for the drive leg 310-*i* is Data[T−1], and the source output S[i] is set to a voltage level $V_{Si}$[T−1] corresponding to Data[T−1].

At time $t_1$ in the horizontal sync period 502, the pixel data D[i] is changed from Data[T−1] to Data[T]. The change of the pixel data D[i] causes a change in the selection of the gamma bus lines GL[0] to GL[m] (i.e., the selection of the gamma voltages Vg[0] to Vg[m]) by the decoder 340, which causes the voltage at the source output S[i] to start changing toward a voltage level $V_{Si}$[T] corresponding to Data[T] as indicated by the solid line 510. Further, the shunt control signal is asserted in synchronization with the change in the pixel data D[i] at time $t_1$. By asserting the shunt control signal at time $t_1$, the source interpolation selector 350 is set to the shunt mode during the initial stage of the voltage change at the source output S[i].

Figure 6:
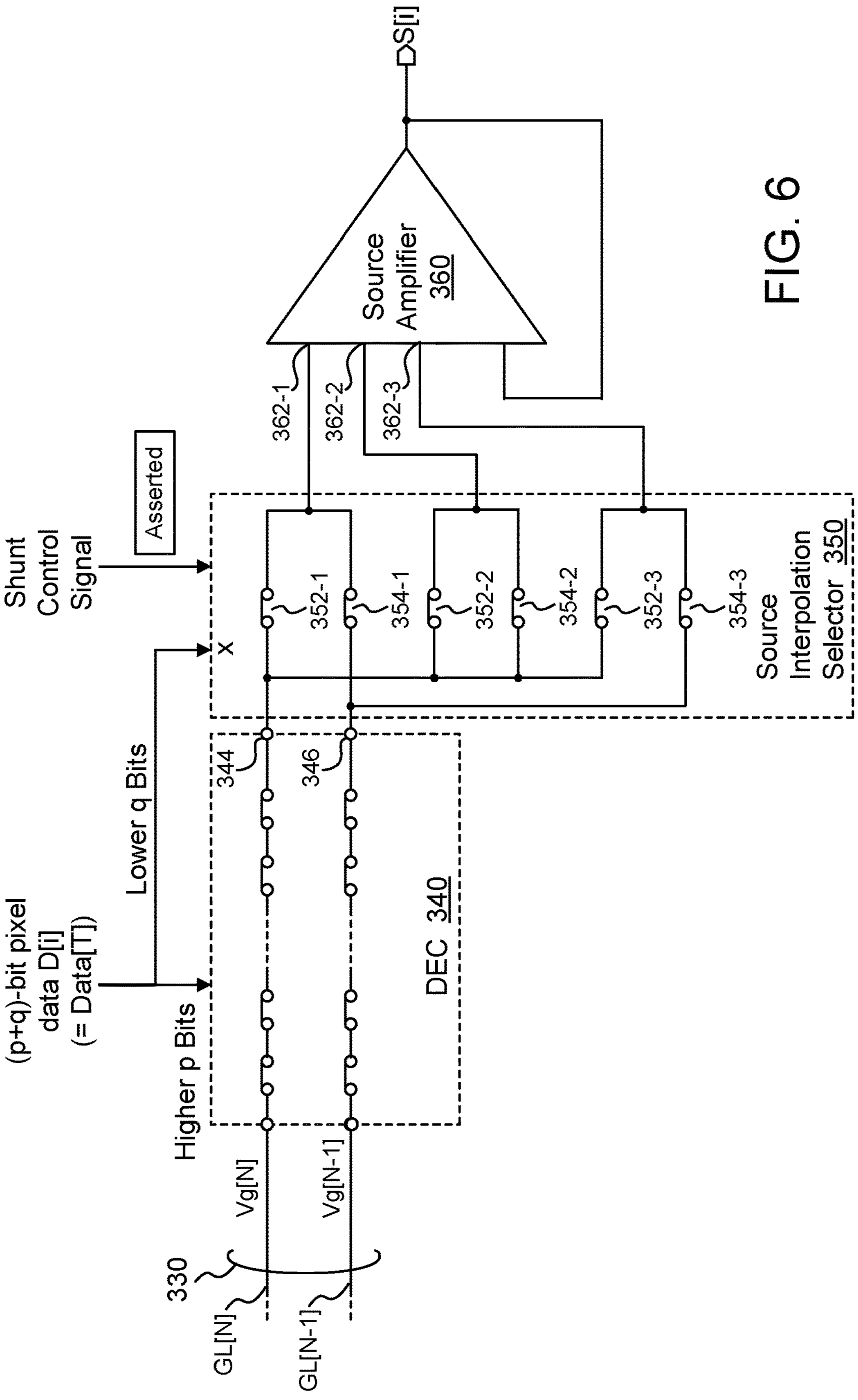
FIG. 6 is a schematic diagram showing an example operation of the drive leg, according to one or more embodiments.
Figure 7:
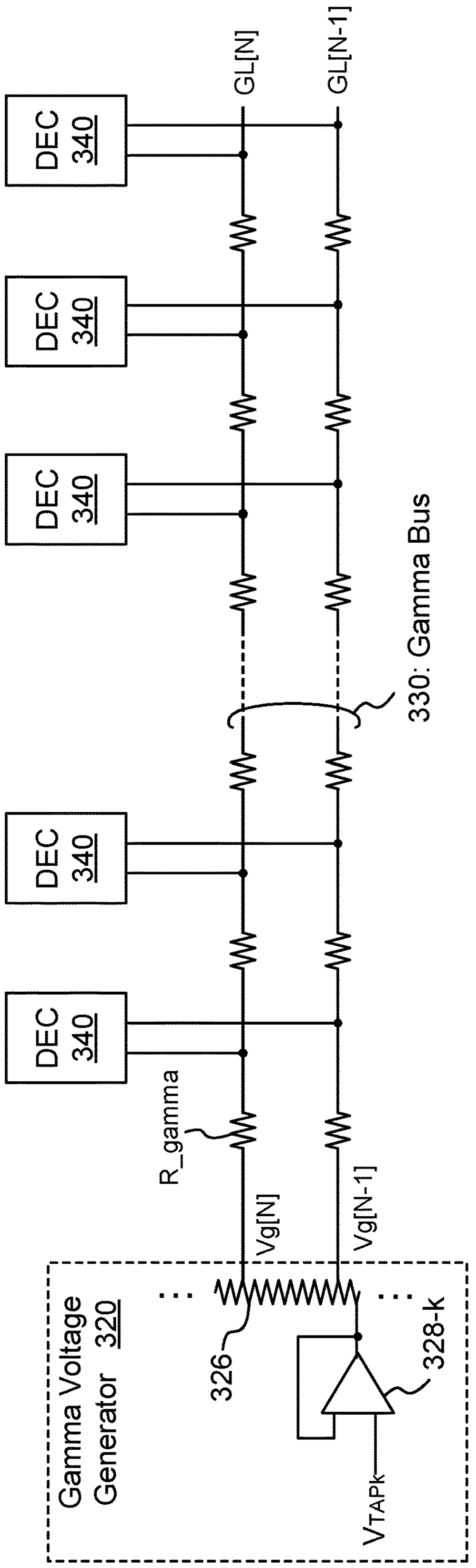
FIG. 7 is an equivalent circuit diagram of selected gamma bus lines, according to one or more embodiments.

FIG. 6 is a schematic diagram showing an example operation of the drive leg 310-*i* during the period between time $t_1$ and time $t_2$ in the horizontal sync period 502, according to one or more embodiments. The decoder 340 selects two adjacent gamma bus lines GL[N] and GL[N−1] from the gamma bus 330 based on the most significant p bits of the pixel data D[i], which is Data[T] during the period between time $t_1$ and time $t_2$, where N is a natural number from one to m. Further, the decoder 340 electrically connects the gamma bus line GL[N] to the first output 344 and the gamma bus line GL[N−1] to the second output 346. It is noted that the gamma bus lines GL[N] and GL[N−1] are used to provide the gamma voltages Vg[N] and Vg[N−1], respectively, from the gamma voltage generator 320 to the decoder 340 of each drive leg 310 as also shown in FIG. 7. The decoder 340 selects the two gamma bus lines GL[N] and GL[N−1] such that the voltage level $V_{Si}$[T] corresponding to Data[T] falls within the voltage range between the gamma voltage Vg[N−1] and the gamma voltage Vg[N], inclusive. The decoder 340 further electrically couples the selected gamma bus line GL[N] to the first output 344 and the selected gamma bus line GL[N−1] to the second output 346.

The source interpolation selector 350 is set to the shunt mode in response to the shunt control signal being asserted at time $t_1$. In the shunt mode, the source interpolation selector 350 closes (or turns on) all the switches 352-1 to 352-3 and 354-1 to 354-3. By closing the switches 352-1 to 352-3 and 354-1 to 354-3, the source interpolation selector 350 electrically connects both the first and second outputs 344 and 346 of the decoder 340 to each of the inputs 362-1, 362-2, and 362-3 of the source amplifier 360. As a result, each of the inputs 362-1, 362-2, and 362-3 of the source amplifier 360 is driven toward a voltage between the gamma voltages Vg[N] and Vg[N−1], causing the source amplifier 360 to drive the source output S[i] toward that voltage.

Meanwhile, the turn-ons of the switches 352-1 to 352-3 and 354-1 to 354-3 electrically connect and short-circuit the first and second outputs 344 and 346 of the decoder 340. The electrical connection of the first and second outputs 344 and 346 results in the gamma bus line GL[N] and the gamma bus line GL[N−1] being electrically connected in parallel. More specifically, a first path formed by the gamma bus line GL[N] and a first set of serially-connected switches in the decoder 340 between the first output 344 and the gamma bus line GL[N] and a second path formed by the gamma bus line GL[N−1] and a second set of serially-connected switches in the decoder 340 between the second output 345 and the gamma bus line GL[N−1] are electrically connected in parallel when the first and second outputs 344 and 346 are electrically connected. Although the resistances across the gamma bus line GL[N] and the gamma bus line GL[N−1] (indicated by “R-gamma” in FIG. 7) and the on-resistances of the serially-connected switches in the decoder 340 may be substantial values, the parallel connection of the first and second paths reduces the effective resistance of the path that provides the gamma voltage to each input of the source amplifier 360, thereby reducing the RC time constant at each input of the source amplifier 360. The reduction in the RC time constant at each input of the source amplifier 360 effectively enhances the slew rate at each input of the source amplifier 360.

Referring back to FIG. 5, the shunt control signal is held asserted during a period of time from time $t_1$ to time $t_2$. In FIG. 5, the assertion duration of the shunt control signal, i.e., the duration of the period between time $t_1$ and time $t_2$, is indicated by “$T_{SH}$”. The assertion duration $T_{SH}$ of the shunt control signal (i.e., the time interval between time $t_1$ and time $t_2$) may be adjusted based on the characteristics of the display panel 200 and the display driver 300, such as the capacitance and/or resistance of the source lines of the display panel 200 and the driving capability of the source amplifier 360. In some embodiments, the display driver 300 may be configured such that the assertion duration $T_{SH}$ of the shunt control signal is programmable. In some embodiments, the register value stored in the register 375 (shown in FIG. 3A) indicates the assertion duration $T_{SH}$ of the shunt control signal. In such embodiments, the assertion duration $T_{SH}$ may be adjusted by programming the register value.

At time $t_2$, the shunt control signal is deasserted to set the source interpolation selector 350 to the select mode. In the shown embodiment, the shunt control signal is held deasserted until time $t_4$ in the next horizontal sync period 504, which starts at time $t_3$.

Figure 8:
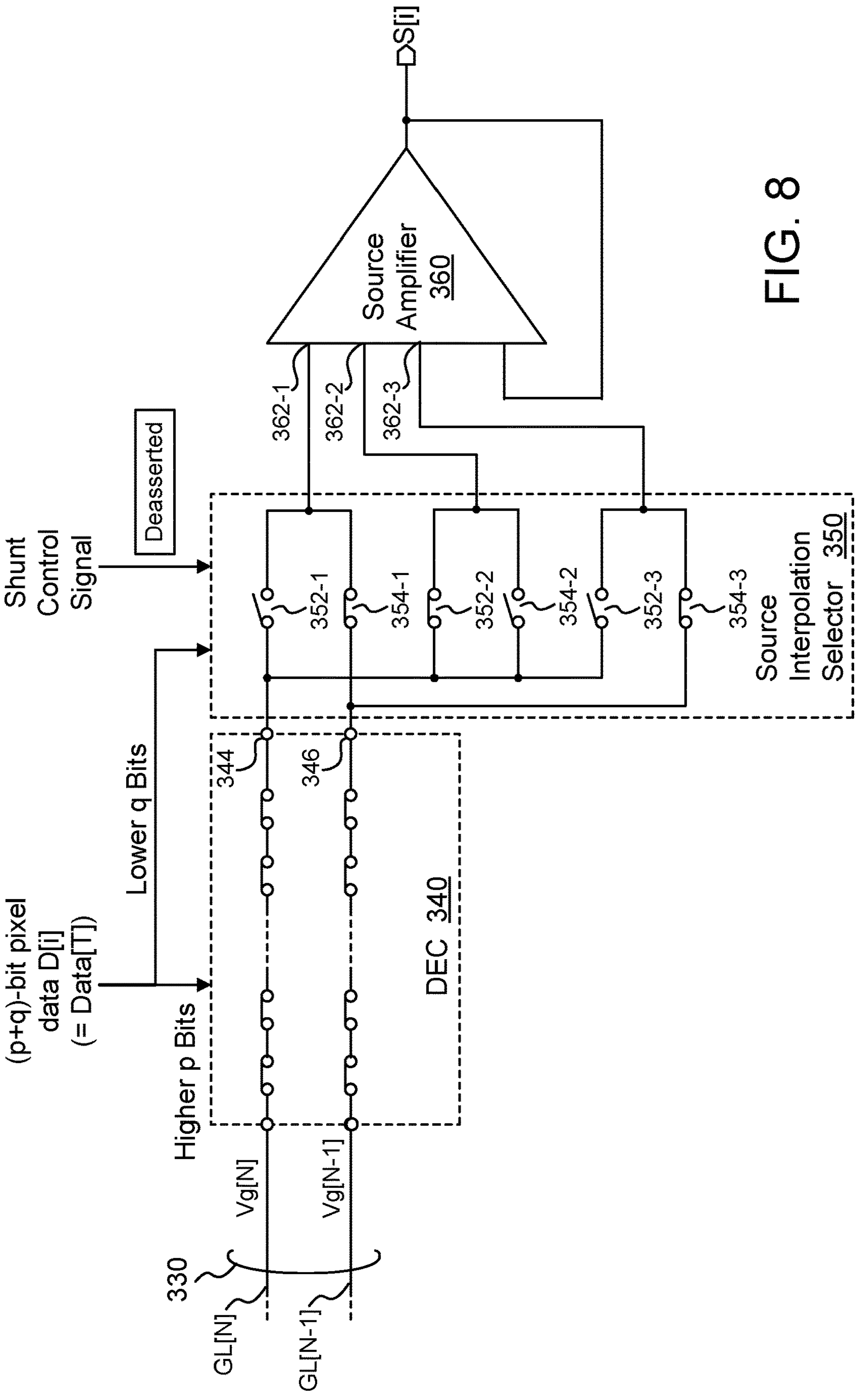
FIG. 8 is a schematic diagram showing an example operation of the drive leg, according to one or more embodiments.

FIG. 8 is a schematic diagram showing an example operation of the drive leg 310-*i* during the time period between time $t_2$ and time $t_4$, according to one or more embodiments. As the source interpolation selector 350 is in the select mode, the source interpolation selector 350 electrically disconnects the first and second outputs 344 and 346 of the decoder 340 from each other. Accordingly, the first output 344 is driven to the gamma voltage Vg[N], which is provided by the gamma bus line GL[N], and the second output 346 is driven to the gamma voltage Vg[N−1], which is provided by the gamma bus line GL[N−1].

Further, the source interpolation selector 350 electrically connects a selected one of the first and second outputs 344 and 346 of the decoder 340 to each of the inputs 362-1, 362-2, and 362-3 of the source amplifier 360 based on the least significant q bits of the pixel data D[i], which is Data[T] during the time period from time $t_2$ to time $t_3$. As a result, the gamma voltage Vg[N] or Vg[N−1] is provided to each of the inputs 362-1, 362-2, and 362-3 of the source amplifier 360 based on the least significant q bits of the pixel data D[i]. More specifically, the source interpolation selector 350 closes (or turns on) one of the switches 352-1 and 354-1 based on the least significant q bits of the pixel data D[i] to electrically connect the corresponding one of the first and second outputs 344 and 346 to the input 362-1 of the source amplifier 360. As a result, the gamma voltage Vg[N] or Vg[N−1] is provided to the input 362-1 based on the least significant q bits of the pixel data D[i]. The source interpolation selector 350 further closes one of the switches 352-2 and 354-2 based on the least significant q bits of the pixel data D[i] to electrically connect the corresponding one of the first and second outputs 344 and 346 to the input 362-2 of the source amplifier 360. As a result, the gamma voltage Vg[N] or Vg[N−1] is provided to the input 362-2 based on the least significant q bits of the pixel data D[i]. The source interpolation selector 350 further closes one of the switches 352-3 and 354-3 based on the least significant q bits of the pixel data D[i] to electrically connect the corresponding one of the first and second outputs 344 and 346 to the input 362-3 of the source amplifier 360. As a result, the gamma voltage Vg[N] or Vg[N−1] is provided to the input 362-3 based on the least significant q bits of the pixel data D[i].

The source amplifier 360 drives the source output S[i] in response to the voltages at the inputs 362-1, 362-2, and 362-3. In one implementation, the source amplifier 360 drives the source output S[i] to a voltage level that is a weighted average of the voltages at the inputs 362-1, 362-2, and 362-3. In embodiments where the weights assigned to the inputs 362-1, 362-2, and 362-3 are 1/4, 2/4, and 1/4, respectively, for example, the voltage $V_{OUT}$ generated at the source output S[i] is expressed by the following expression (2):

$$V_{OUT} = (1/4)V_{IN1} + (2/4)V_{IN2} + (1/4)V_{IN3}, \quad (2)$$

where $V_{IN1}$, $V_{IN2}$, and $V_{IN3}$ are the voltages at the inputs 362-1, 362-2, and 362-3, respectively. The voltage generated at the source output S[i] is used as a data voltage to program a selected pixel coupled to the source output S[i]. The combination of the gamma voltages (Vg[N] or Vg[N−1]) provided to the respective inputs 362-1, 362-2, and 362-3 is determined such that the voltage at the source output S[i] is driven to the voltage level $V_{Si}$[T] corresponding to Data[T].

Referring back to FIG. 5, the drive leg 310-*i* may operate in a similar manner during the next horizontal sync period 504, which starts at time $t_3$. In the shown embodiment, the pixel data D[i] is changed from Data[T] to Data[T+1] at time $t_4$ in the horizontal sync period 504, and the shunt control signal is asserted in synchronization with the change of the pixel data D[i] at time $t_4$. After time $t_4$, the drive leg 310-*i* performs an operation similar to the above-described operation described in relation to FIGS. 6 to 8 except for that the pixel data D[i] is changed from Data[T] to Data[T+1]. More specifically, the change in the pixel data D[i] causes a change in the selection of the gamma bus lines GL[0] to GL[m] (i.e., the selection of the gamma voltages Vg[0] to Vg[m]) by the decoder 340, resulting in the voltage at the source output S[i] starting changing toward a voltage level $V_{Si}$[T+1] that corresponds to Data[T+1], as indicated by the solid line 510. Further, the assertion of the shunt control signal sets the source interpolation selector 350 to the shunt mode to electrically couple the first and second outputs 344 and 346 of the decoder 340. The shunt control signal is held asserted until time $t_5$. The shunt control signal is then deasserted at time $t_5$ to set the source interpolation selector 350 to the select mode. In the select mode, the source interpolation selector 350 provides one of the selected two gamma voltages to each of the inputs 362-1, 362-2, and 362-3 of the source amplifier 360. The source amplifier 360 drives the source output S[i] to the voltage level $V_{Si}$[T+1] corresponding to Data[T+1] in response to the voltages at the inputs 362-1, 362-2, and 362-3.

It is noted that, while FIG. 5 shows that the pixel data D[i] is changed once during each of the horizontal sync periods, the pixel data D[i] may be changed a plurality of times during each of the horizontal sync periods.

The operation described above in relation to FIGS. 5 to 8 effectively enhances the slew rate at the inputs of the source amplifier 360 during the initial stage of the change in the voltage at the source output S[i], thereby achieving a reduction in the settling time of the source amplifier 360. An example of the reduction in the settling time is shown in FIG. 5, wherein the solid line 510 indicates example changes in the voltage at the source output S[i] with the first and second outputs 344 and 346 of the decoder 340 electrically connected during the initial stage, and the broken lines 520 and 525 indicate example changes in the voltage at the source output S[i] without the first and second outputs 344 and 346 electrically connected during the initial stage.

Figure 9:
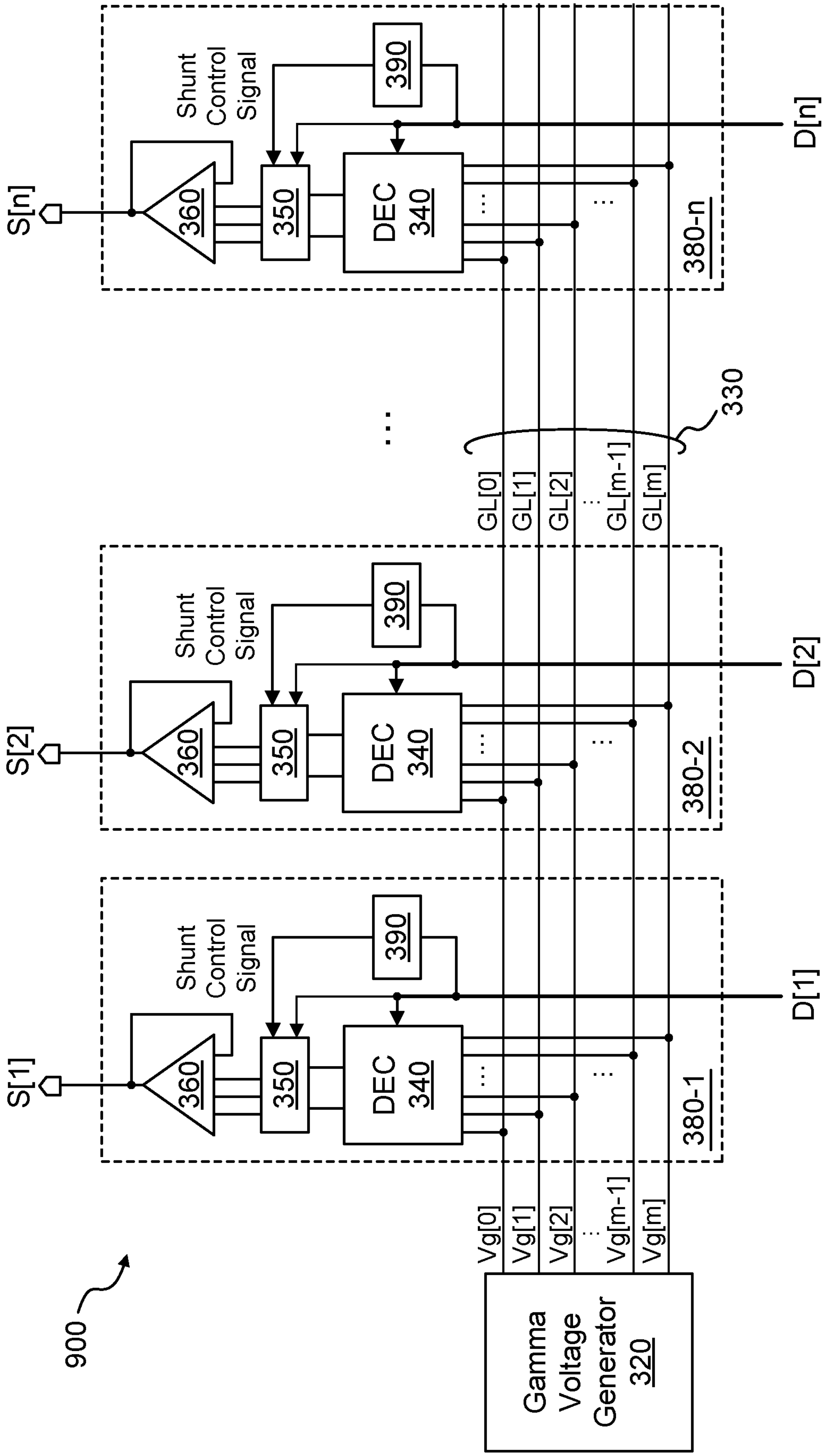
FIG. 9 shows an example configuration of a display driver, according to other embodiments.

FIG. 9 shows an example configuration of a display driver 900, according to other embodiments. The display driver 900 is configured in a manner similar to the display driver 300 shown in FIG. 3A and operates in a manner similar to that shown in FIG. 5. One difference is that each drive leg 380-*i* includes a control circuit 390 configured to provide the shunt control signal to the source interpolation selector 350. The control circuit 390 is configured to control the assertion duration ("$T_{SH}$" shown in FIG. 5) of the shunt control signal. The control circuit 390 of the drive leg 380-*i* is configured to generate and provide the shunt control signal to the source interpolation selector 350 based on the pixel data D[i]. In one or more embodiments, the control circuit 390 of the drive leg 380-*i* is configured to adjust the assertion duration $T_{SH}$ of the shunt control signal based on the pixel data D[i]. Using the pixel data D[i] to adjust the assertion duration $T_{SH}$ of the shunt control signal may allow the assertion duration $T_{SH}$ to be determined appropriately for the change in the voltages at the inputs of the source amplifier 360.

In various embodiments, the control circuit 390 of each drive leg 380-*i* may be configured to adjust the assertion duration $T_{SH}$ (shown in FIG. 5) of the shunt control signal based on Data[T−1] and Data[T] when the pixel data D[i] changes from Data[T−1] to Data[T]. It is noted that Data [T−1] is the previous pixel data provided to the decoder 340 before Data[T] is provided to the decoder 340. In some embodiments, the control circuit 390 of each drive leg 380-*i* may be configured to adjust the assertion duration $T_{SH}$ of the shunt control signal based on the difference between Data [T−1] and Data[T] (more specifically, between the greylevel specified by Data[T−1] and the greylevel specified by Data [T]) when the pixel data D[i] changes from Data[T−1] to Data[T]. In one implementation, the assertion duration $T_{SH}$ of the shunt control signal is adjusted such that the assertion duration $T_{SH}$ increases as the difference of between Data[T−1] and Data[T] (or the difference between the greylevel specified by Data[T−1] and the greylevel specified by Data [T]) increases.

In some implementations, the control circuit 390 of each drive leg 380-*i* may be configured to adjust the assertion duration $T_{SH}$ of the shunt control signal based on one or more most significant bits of Data[T−1] and Data[T] when the pixel data D[i] changes from Data[T−1] to Data[T]. In embodiments where Data[T−1] and Data[T] are (p+q)-bit data, the assertion duration $T_{SH}$ of the shunt control signal may be adjusted based on most significant r-bits of Data[T−1] and Data[T], where r is an integer less than p+q. By using only one or more most significant bits of Data[T−1] and Data[T], the circuit size of the control circuit 390 can be advantageously reduced. The control circuit 390 of each drive leg 380-*i* may be configured to adjust the assertion duration $T_{SH}$ of the shunt control based on the difference in the one or more most significant bits between Data[T−1] and Data[T]. In one implementation, the control circuit 390 of each drive leg 380-*i* may be configured to adjust the assertion duration $T_{SH}$ of the shunt control based on the difference between the most significant bit (MSB) of Data[T−1] and the MSB of Data[T].

Figure 10:
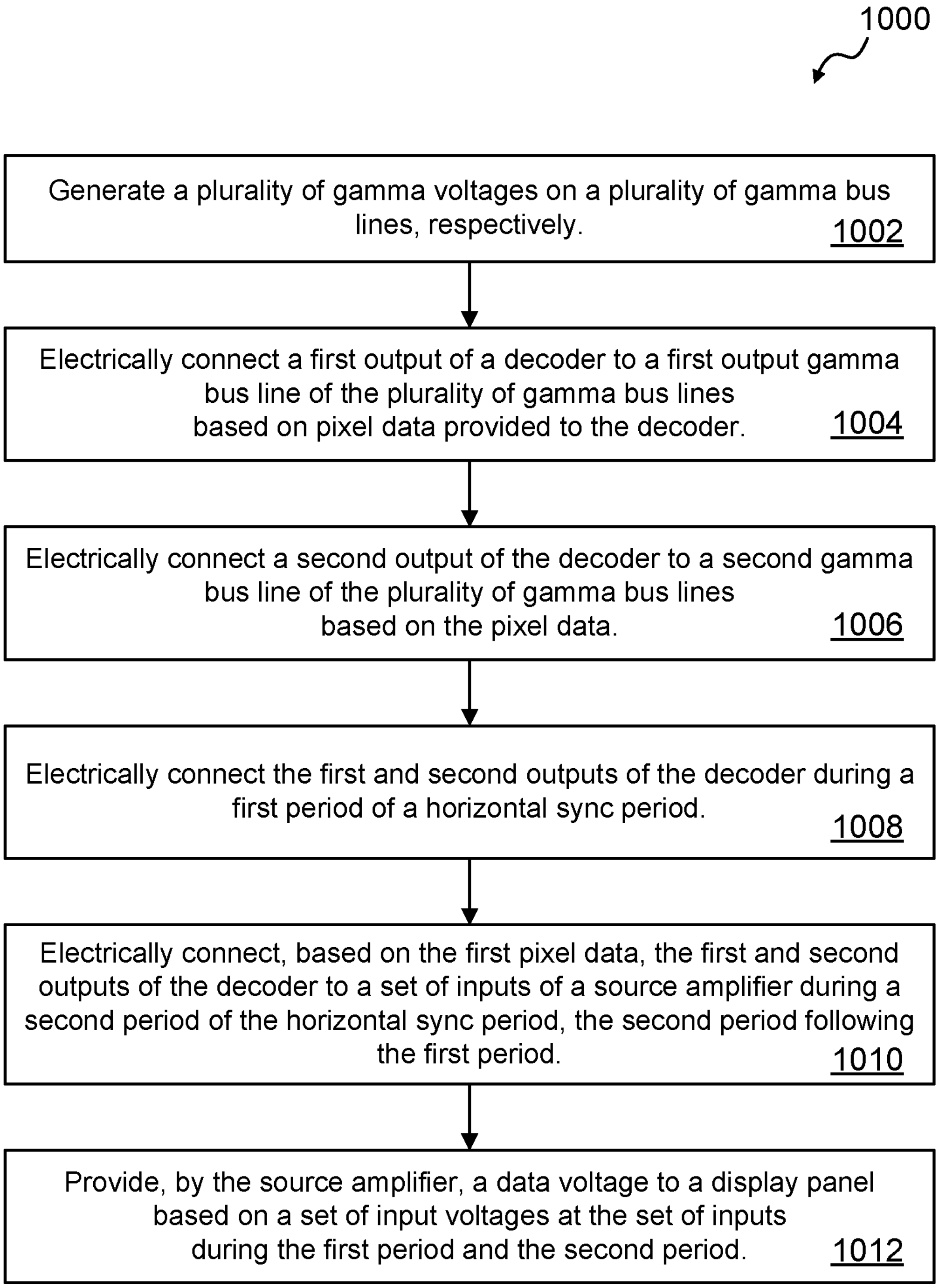
FIG. 10 is a flowchart of an exemplary process for driving a display panel, according to one or more embodiments.

FIG. 10 is a flowchart of an exemplary process for driving a display panel, according to one or more examples of the present disclosure. The process 1000 may be performed by the display driver 300 shown in FIG. 3A or FIG. 9. However, it will be recognized that a display driver that includes additional and/or fewer components as shown in FIG. 3A or FIG. 9 may be used to perform the process 1000, that any of the following steps may be performed in any suitable order, and that the process 1000 may be performed in any suitable environment.

The process 1000 includes generating a plurality of gamma voltages (e.g., the gamma voltages Vg[0] to Vg[m] shown in FIGS. 3A and 9) on a plurality of gamma bus lines (e.g., the gamma bus lines GL[0] to GL[m]), respectively, at step 1002.

The process 1000 further includes electrically connecting, at step 1004, a first output (e.g., the first output 344 shown in FIG. 4) of a decoder (e.g., the decoder 340) to a first gamma bus line (e.g., the gamma bus line GL[N] shown in FIG. 6) of the plurality of gamma bus lines based on first pixel data (e.g., the pixel data D[i] shown in FIGS. 3A, 6, and 9) provided to the decoder. The process 1000 further includes electrically connecting, at step 1006, a second output (e.g., the second output 346 shown in FIG. 4) of the decoder to a second gamma bus line (e.g., the gamma bus line GL[N−1] shown in FIG. 6) of the plurality of gamma bus lines based on the first pixel data.

The process 1000 further includes electrically connecting, at step 1008, the first and second outputs of the decoder during a first period (e.g., the period between time $t_1$ and time $t_2$ shown in FIG. 5) of a horizontal sync period (e.g., the horizontal sync period 502 shown in FIG. 5).

The process 1000 further includes providing, based on the first pixel data at step 1010, electrical connections between the first and second outputs of the decoder and a set of inputs of a source amplifier (e.g., the source amplifier 360 shown in FIGS. 3A and 9) during a second period (e.g., the period between time $t_2$ and time $t_3$ shown in FIG. 5) of the horizontal sync period, the second period following the first period.

The process 1000 further includes providing, by the source amplifier at step 1012, a data voltage to a display panel (e.g., the display panel 200 shown in FIG. 2) based on a set of input voltages at the set of inputs during the first period and the second period.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Exemplary embodiments are described herein. Variations of those exemplary embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A display driver, comprising:

a plurality of gamma bus lines on which a plurality of gamma voltages are generated, respectively; and a drive leg configured to receive first pixel data and the plurality of gamma voltages, the drive leg comprising:

a decoder comprising first and second outputs, wherein the decoder is configured to:

electrically connect the first output to a first gamma bus line of the plurality of gamma bus lines based on the first pixel data, and electrically connect the second output to a second gamma bus line of the plurality of gamma bus lines based on the first pixel data;

a source amplifier comprising a set of inputs and configured to provide a data voltage to a display panel based on a set of input voltages at the set of inputs; and a source interpolation selector configured to:

provide, based on the first pixel data, electrical connections between the first and second outputs of the decoder and the set of inputs of the source amplifier, and electrically connect the first and second outputs of the decoder during a first period of a horizontal sync period.

2. The display driver of claim 1, wherein the source interpolation selector is further configured to electrically connect the respective inputs of the source amplifier to the first output or the second output during a second period of the horizontal sync period, the second period following the first period.

3. The display driver of claim 1, wherein the source interpolation selector comprises:

a first set of switches coupled between the first output of the decoder and the set of inputs of the source amplifier, respectively; and a second set of switches coupled between the second output of the decoder and the set of inputs of the source amplifier, respectively.

4. The display driver of claim 3, wherein electrically connecting the first and second outputs of the decoder during the first period comprises closing all of the first set of switches and all of the second set of switches during the first period.

5. The display driver of claim 1, wherein the source interpolation selector is further configured to receive a shunt control signal, wherein electrically connecting the first and second outputs of the decoder during the first period of the horizontal sync period is responsive to the shunt control signal.

6. The display driver of claim 1, wherein a duration of the first period is programmable.

7. The display driver of claim 1, further comprising a control circuit configured to adjust a duration of the first period.

8. The display driver of claim 7, wherein adjusting the duration of the first period is based on the first pixel data and second pixel data provided to the decoder before the first pixel data is provided to the decoder.

9. The display driver of claim 7, wherein adjusting the duration of the first period is based on a difference between the first pixel data and second pixel data provided to the decoder before the first pixel data is provided to the decoder.

10. The display driver of claim 7, wherein adjusting the duration of the first period is based on one or more most significant bits of the first pixel data and second pixel data provided to the decoder before the first pixel data is provided to the decoder.

11. A display device, comprising:

a display panel; and a display driver comprising:

a plurality of gamma bus lines on which a plurality of gamma voltages are generated, respectively; and a drive leg configured to receive first pixel data and the plurality of gamma voltages, the drive leg comprising:

a decoder comprising first and second outputs, wherein the decoder is configured to:

electrically connect the first output to a first gamma bus line of the plurality of gamma bus lines based on the first pixel data, and electrically connect the second output to a second gamma bus line of the plurality of gamma bus lines based on the first pixel data;

a source amplifier comprising a set of inputs and configured to provide a data voltage to the display panel based on a set of input voltages at the set of inputs; and a source interpolation selector configured to:

provide, based on the first pixel data, electrical connections between the first and second outputs of the decoder and the set of inputs of the source amplifier, and electrically connect the first and second outputs of the decoder during a first period of a horizontal sync period.

12. The display device of claim 11, wherein the source interpolation selector is further configured to electrically connect the respective inputs of the source amplifier to the first output or the second output during a second period of the horizontal sync period, the second period following the first period.

13. The display device of claim 11, wherein the source interpolation selector comprises:

a first set of switches coupled between the first output of the decoder and the set of inputs of the source amplifier, respectively; and a second set of switches coupled between the second output of the decoder and the set of inputs of the source amplifier, respectively.

14. The display device of claim 13, wherein electrically connecting the first and second outputs of the decoder during the first period comprises closing all of the first set of switches and all of the second set of switches during the first period.

15. The display device of claim 11, wherein the source interpolation selector is further configured to receive a shunt control signal, wherein electrically connecting the first and second outputs of the decoder during the first period of the horizontal sync period is responsive to the shunt control signal.

16. The display driver of claim 11, further comprising a control circuit configured to adjust a duration of the first period.

17. The display driver of claim 16, wherein adjusting the duration of the first period is based on the first pixel data and second pixel data provided to the decoder before the first pixel data is provided to the decoder.

18. A method, comprising:

generating a plurality of gamma voltages on a plurality of gamma bus lines, respectively;

electrically connecting a first output of a decoder to a first gamma bus line of the plurality of gamma bus lines based on first pixel data provided to the decoder;

electrically connecting a second output of the decoder to a second gamma bus line of the plurality of gamma bus lines based on the first pixel data;

electrically connecting the first output and second output of the decoder during a first period of a horizontal sync period;

electrically connecting, based on the first pixel data, the first and second outputs of the decoder to a set of inputs of a source amplifier during a second period of the horizontal sync period, the second period following the first period; and providing, by the source amplifier, a data voltage to a display panel based on a set of input voltages at the set of inputs during the first period and the second period.

19. The method of claim 18, wherein a first set of switches are coupled between the first output of the decoder and the set of inputs of the source amplifier, respectively, wherein a second set of switches are coupled between the second output of the decoder and the set of inputs of the source amplifier, respectively, wherein electrically connecting the first output and second output of the decoder comprises closing all of the first set of switches and all of the second set of switches during the first period.

20. The method of claim 18, further comprising adjusting a duration of the first period based on the first pixel data and second pixel data provided to the decoder before the first pixel data is provided to the decoder.

* * * * *